(12) United States Patent
Hsiang

(10) Patent No.: US 8,974,350 B2
(45) Date of Patent: Mar. 10, 2015

(54) TRAMPOLINE

(75) Inventor: Hua-Lu Hsiang, Taoyuan (TW)

(73) Assignee: Crowntec Fitness Mfg., Ltd., Taoyuan (TW)

( * ) Notice: Subject to any disclaimer, the term of this patent is extended or adjusted under 35 U.S.C. 154(b) by 428 days.

(21) Appl. No.: 13/209,978

(22) Filed: Aug. 15, 2011

(65) Prior Publication Data

US 2013/0045837 A1 Feb. 21, 2013

(51) Int. Cl.
*A63B 5/11* (2006.01)
*A63B 21/02* (2006.01)
*F16B 7/04* (2006.01)
*A63B 71/02* (2006.01)
*A63B 71/00* (2006.01)

(52) U.S. Cl.
CPC ............... *A63B 5/11* (2013.01); *A63B 21/023* (2013.01); *F16B 7/042* (2013.01); *A63B 71/022* (2013.01); *A63B 2071/009* (2013.01); *A63B 2210/50* (2013.01)
USPC ........................................................ 482/27

(58) Field of Classification Search
CPC ........................................................ A63B 5/11
USPC ........................................................ 482/27
See application file for complete search history.

(56) References Cited

U.S. PATENT DOCUMENTS

| | | | | |
|---|---|---|---|---|
| 3,201,126 A | * | 8/1965 | Nissen | 273/393 |
| 3,869,120 A | * | 3/1975 | Nissen | 482/27 |
| 4,474,369 A | * | 10/1984 | Gordon | 472/92 |
| 6,237,169 B1 | * | 5/2001 | Ying | 5/111 |
| 7,766,795 B2 | | 8/2010 | Publicover | |
| 7,854,687 B2 | | 12/2010 | Alexander | |
| 2005/0054485 A1 | * | 3/2005 | McDermott et al. | 482/27 |
| 2006/0189441 A1 | * | 8/2006 | VanElverdinghe et al. | 482/27 |
| 2009/0023558 A1 | * | 1/2009 | VanElverdinghe | 482/29 |
| 2010/0190608 A1 | | 7/2010 | Publicover et al. | |
| 2010/0240496 A1 | | 9/2010 | Chen | |
| 2010/0273611 A1 | | 10/2010 | Publicover | |
| 2010/0311545 A1 | | 12/2010 | Fenn et al. | |

FOREIGN PATENT DOCUMENTS

CN 2571421 Y 9/2003

\* cited by examiner

*Primary Examiner* — Loan H Thanh
*Assistant Examiner* — Rae Fischer
(74) *Attorney, Agent, or Firm* — Muncy, Geissler, Olds & Lowe, P.C.

(57) ABSTRACT

A trampoline includes a rebounding portion and a circular support rack. The rebounding portion includes a pad and a plurality of elastic members located on the circumference of the pad. The circular support rack is located around the rebounding portion and connected to the elastic members, and includes an inner ring side facing the rebounding portion and an outer ring side opposite to the inner ring side, and also includes at least one first support tube and one second support tube. The first support tube and second support tube have respectively a bent tube section, a first coupling end and a second coupling end corresponding to the first coupling end. The first coupling end includes a first support section located on the inner ring side, a second support section located on the outer ring side and at least one first ridge between the first and second support sections.

8 Claims, 9 Drawing Sheets

TRAMPOLINE

FIELD OF THE INVENTION

The present invention relates to a trampoline and particularly to a trampoline with greater durability.

BACKGROUND OF THE INVENTION

Affluent people of modern time have greater awareness on life quality enhancing activities such as leisure activities and exercises. Many people these days lack enough exercises and exercise space. To overcome these constraints many exercise equipments and fitness facilities have been developed that take smaller space and are simple in use.

For instance U.S. Pat. No. 7,766,795 discloses a trampoline system which includes a circular frame supported by a plurality of legs. The circular frame is coupled with a rebounding mat through a plurality of spring members and a cylindrical wall made of a resilient net to prevent users from being thrown outside the trampoline when in use. When a user jumps and rebounds from the mat the spring members are stretched by the weight of the user and mat. The spring members have other ends connected to the circular frame which receives the forces transferred from the spring members. When in use the support structure, including the circular frame and legs, have to bear significant pressure.

U.S. publication 2010/0273611 discloses another type of trampoline. The pressure of springs levied on the circular frame is discussed as follow. Its FIG. 3 shows the connection relationship between the spring and frame. The spring has one end latched on the frame at an upper side close to the inner side. When a user jumps on the trampoline the spring stretches the frame. Based on mechanics the stretching force of the spring is divided into a horizontal component and a vertical component. The mat of the trampoline sinks under user's weight, and the force of the vertical component levied on the frame is much greater than that of the horizontal component. I.e., the frame, aside from receiving the inward stretching force, also receives a great vertical pressure.

In theory, multi-directional stresses exerted onto a frame made of circular tubes can offset each other. The frame made of circular tubes has many advantages, such as lower cost and easy assembly. But research and use experiences show that the spring exerts unidirectional force on the frame. The stretching force of the spring exerted onto the tubular frame is fixed in location and direction. The tubular frame cannot effectively offset or distribute the received stress. After used for a period of time junctions of the frame tend to deform due to the pressure caused by user's jumping. The upper side and lower side of the circular tube receive more stress under the stretching of the spring onto the frame. Moreover, the circular frame usually is made by coupling a plurality of tubes, and the junctions of the tubes are the most fragile spots while the received stress is greatest. Thus deformation easily takes place after used for a prolonged period of time and the concern of safety deficiency arises.

Most known conventional trampolines adopt the frame of circular tubes. Besides the aforesaid U.S. Pat. No. 7,766,795 and U.S. publication 2010/0273611, U.S. Pat. No. 7,854,687 and U.S. publication Nos. 2010/0311545 and 2010/0190608 and China Patent CN2571421 also disclose trampolines using the frame of circular tubes.

In order to improve physical strength, aside from the frame of circular tubes, other frame alterations have been made, such as U.S. publication 2010/0240496. Its FIG. 3 shows that the tubular junctions of the frame are formed with flat surfaces on the upper and lower surfaces and arched coupling surfaces between the upper and lower flat surfaces in a deformed quadrilateral like a race track to provide support and enhance physical strength.

However, in order to increase the lifespan of trampoline and enhance user's safety during use, there is still room for improvement in terms of the structural design of the circular frame, especially on the tubular junctions, to make sure that sufficient stress-withstanding strength is provided, and tight coupling of tubes is formed to improve durability of trampoline.

SUMMARY OF THE INVENTION

In view of the conventional trampolines mostly have the frame made of circular tubes that have the problem of receiving uneven forces on the junctions and result in deformation.

Therefore the primary object of the present invention is to provide a trampoline that includes a rebounding portion and a circular support rack. The rebounding portion includes a pad and a plurality of elastic members located on the circumference of the pad. The rebounding portion includes a pad and a plurality of elastic members located around the pad. The circular support rack is located annularly on the outer side of the rebounding portion and connected to the elastic members, and includes an inner ring side facing the rebounding portion and an outer ring side opposite to the inner ring side, and also includes at least one first support tube and one second support tube. The first support tube and second support tube have respectively a first coupling end and a second coupling end corresponding to the first coupling end, and a bent tube section bridging the first and second coupling ends. The first coupling end includes a first support section on the inner ring side and a second support section on the outer ring side, and at least one first ridge located between the first and second support sections.

In another embodiment of the invention the pad is surrounded by a plurality of connection rings, and each elastic member includes a first end fastened to the connection ring and a second end fastened to the circular support rack. The first and second support sections have respectively a connecting section connected to the first ridge. The first ridge may also be formed respectively on the upper side and lower side between the first and second support sections. In addition to the first ridge formed between the first and second support sections, the first support section further may have a second ridge and the second support section may have a third ridge to increase the physical strength of the first and second support sections. The second coupling end corresponding to the first coupling end has a first auxiliary support section corresponding to the first support section and a second auxiliary support section corresponding to the second support section, and a first auxiliary ridge corresponding to the first ridge. The first support tube further includes a branch tube to connect to a leg.

In yet another embodiment of the invention the inner ring side of the bent tube section has a first groove and the outer ring side has a second groove to disperse the stress of the bent tube.

The present invention, by providing the ridge structure on the first coupling ends of the first and second support tubes can increase the physical strength of the circular support rack than the conventional frame made of circular tubes, and also can evenly disperse the stress withstood by the circular support rack to other portions. Furthermore, the bent tubes of the first and second support tubes have at least one groove indented inwards to further enhance the physical strength of the circular support rack to improve durability.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
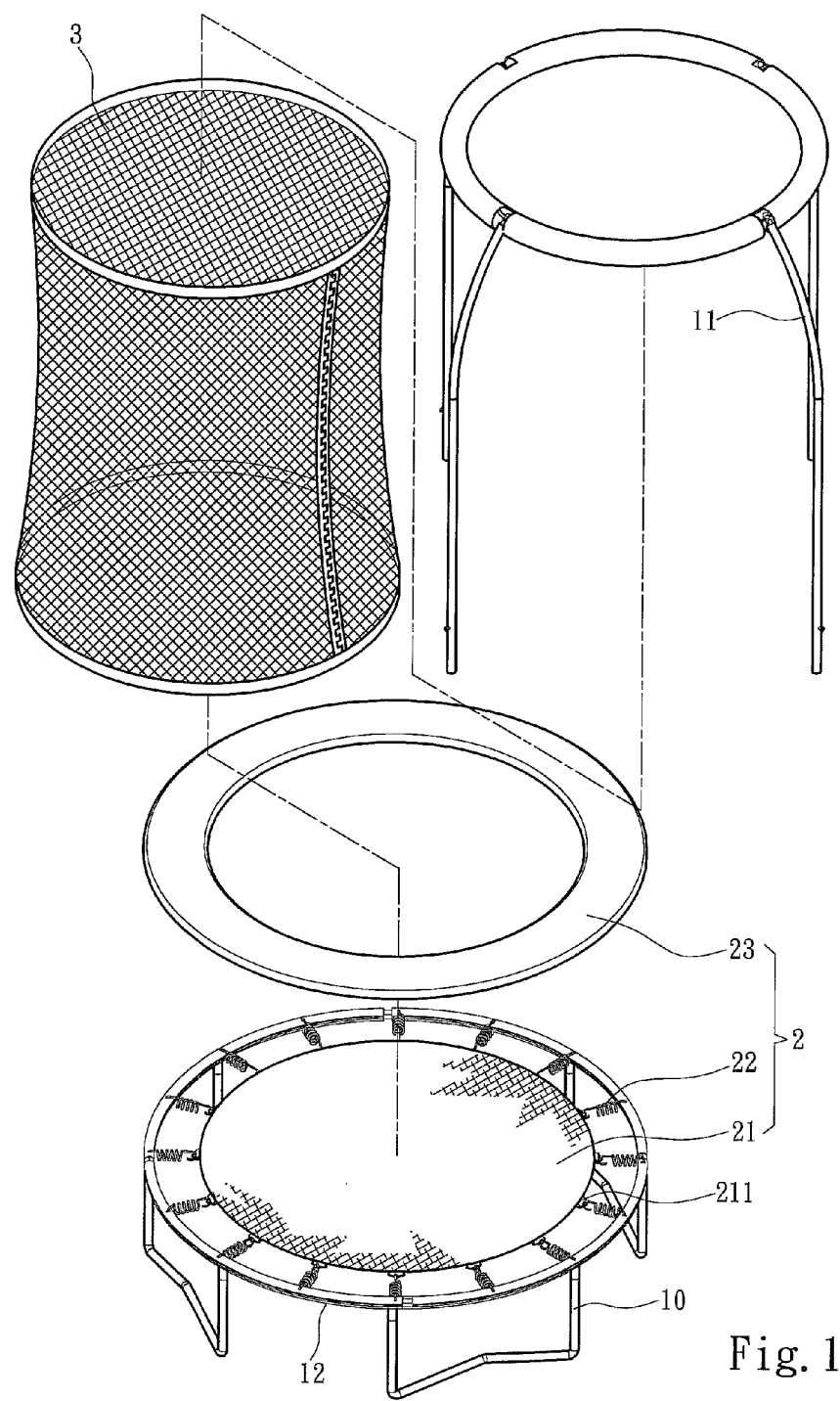
FIG. 1 is an exploded view of the trampoline of the invention.
Figure 2:
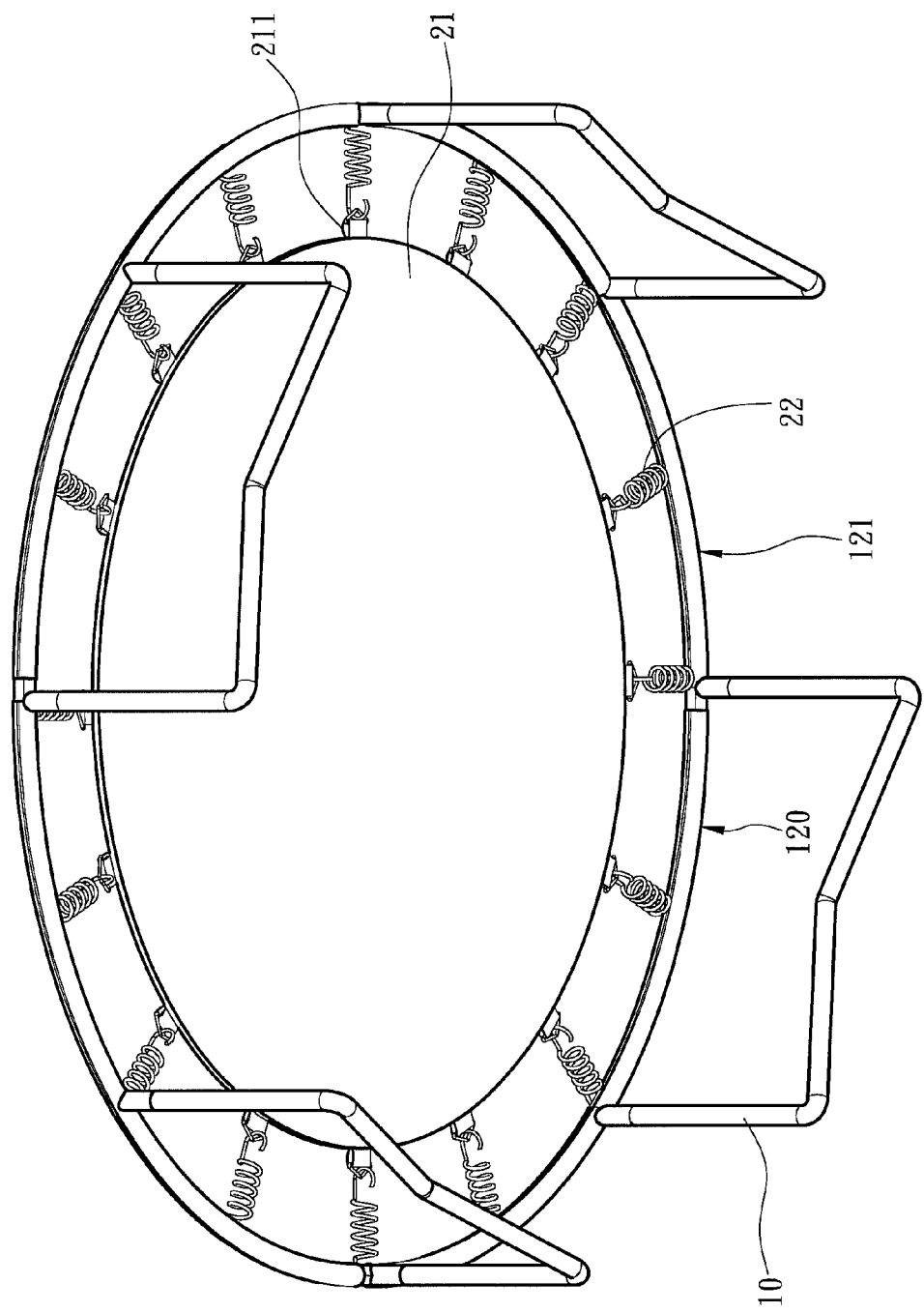
FIG. 2 is a perspective view of the circular support rack.
Figure 3:
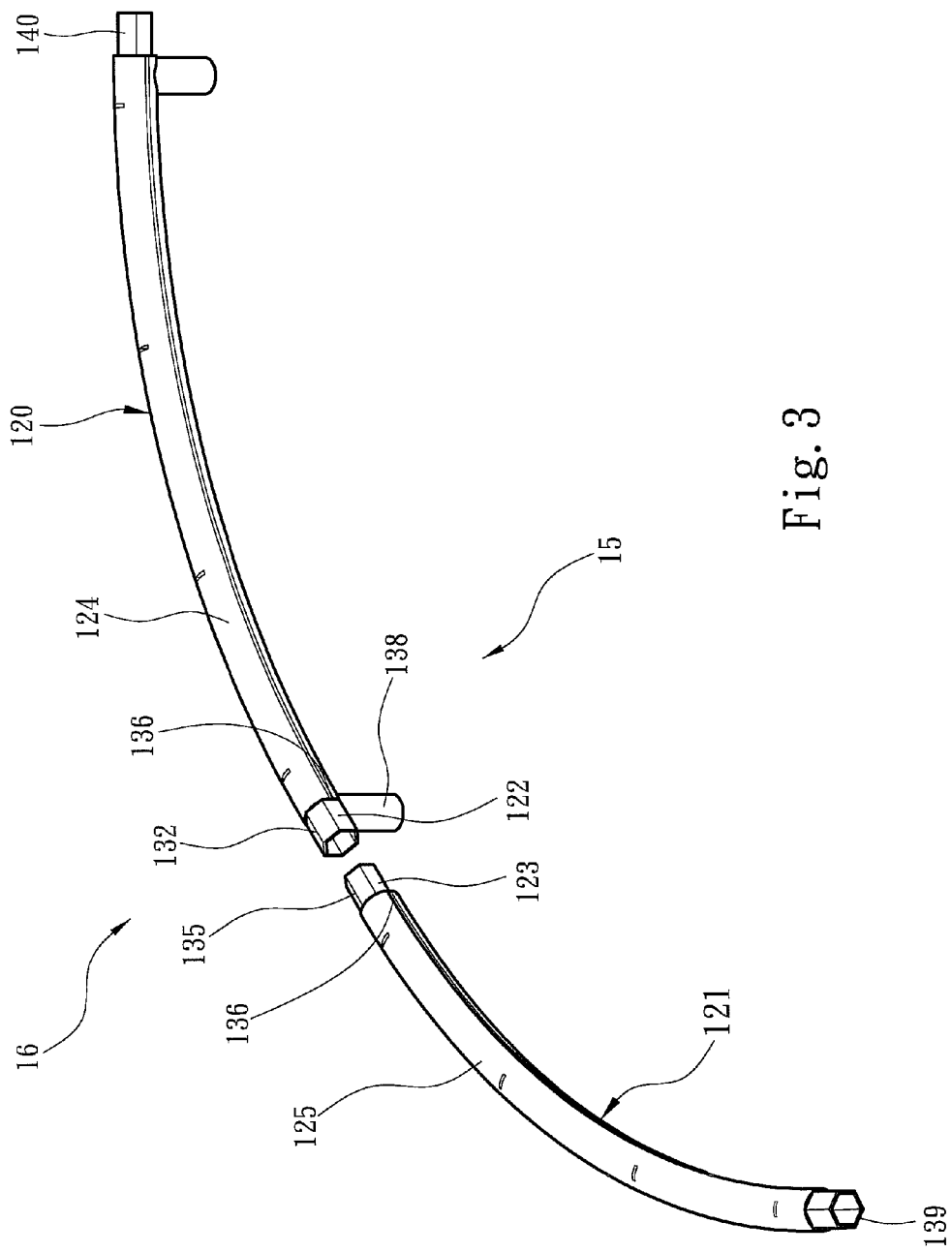
FIG. 3 is an exploded view of the first and second support tubes.

Please referring to FIGS. 1, 2 and 3, the present invention aims to provide a trampoline that includes a frame and a rebounding portion 2. In order to protect users the trampoline further has a guarding net 3 installed thereon. The frame includes a circular support rack 12 and a plurality of legs 10 supporting the circular support rack 12. The frame further has a plurality of support brackets 11 to hold and hang the guarding net 3 to facilitate installation thereof. Referring to FIG. 2, the rebounding portion 2 includes a pad 21 and a plurality of elastic members 22 on the circumference of the pad 21. The perimeter of the pad 21 also has a plurality of connection rings 211. Each elastic member 22 has a first end fastened to one connection ring 211 and a second end fastened to the circular support rack 12. Also referring to FIG. 1, to avoid users from falling into gaps between the elastic members 22 a protective mat 23 is provided to cover the gaps. The circular support rack 12 includes at least one first support tube 120 and at least one second support tube 121. In this embodiment the circular support rack 12 includes a plurality of first support tubes 120 and second support tubes 121 that are coupled through heads and tails thereof to form the circular support rack 12. While the circular support rack 12 shown in the drawings is circular, this is not the limitation, a polygonal shape may also be adopted. The circular support rack 12 surrounds the rebounding portion 2 and is divided into an inner ring side 15 facing the rebounding portion 2 and an outer ring side 16 opposite to the inner ring side 15. As shown in FIG. 3, the first and second support tubes 120 and 121 have respectively a first coupling end 122 and 139, and a second coupling end 123 and 140. The first coupling end 122 of the first support tube 120 is coupled with the second coupling end 123 of the second support tube 121. The first coupling end 122 and second coupling end 140 of the first support tube 120 is bridged by a first bent tube section 124. The first coupling end 139 and second coupling end 123 of the second support tube 121 is bridged by a second bent tube section 125. The first support tube 120 further includes a branch tube 138 to couple with the leg 10.

Figure 4:
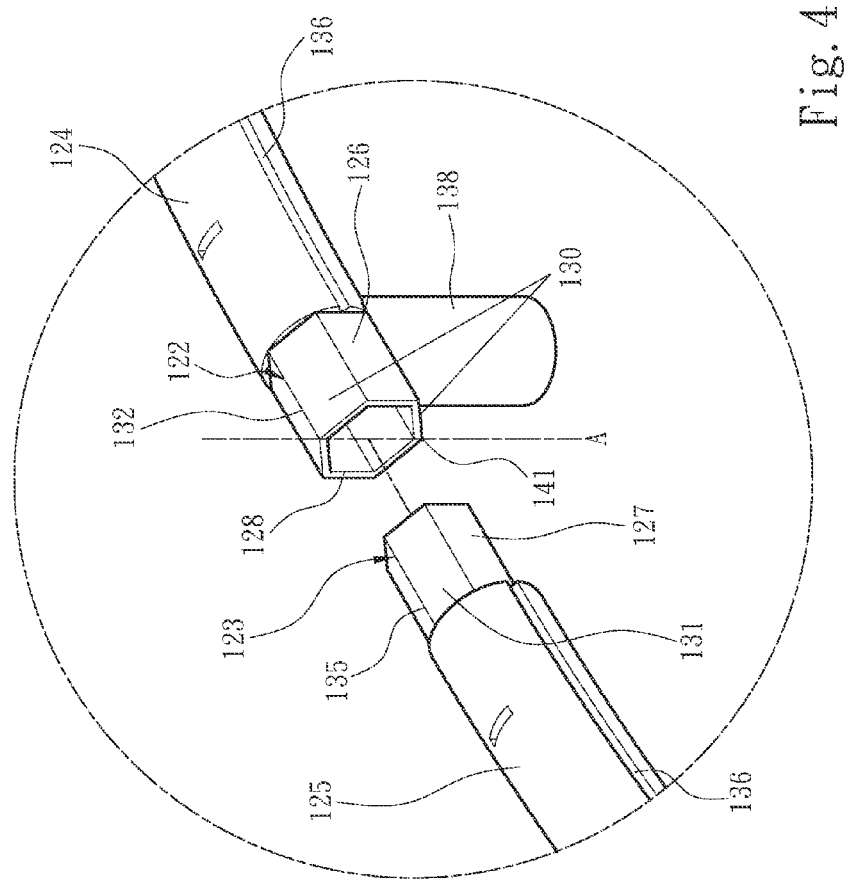
FIG. 4 is a schematic view of the first and second support tubes in a coupling condition.

Also referring to FIGS. 3 and 4, the first coupling end 122 of the first support tube 120 has a first support section 126 on the inner ring side 15, a second support section 128 on the outer ring side 16 and at least one first ridge 132 and one fourth ridge 141 between the first and second support sections 126 and 128. The first ridge 132 and the fourth ridge 141 are positioned on the opposite side of the first coupling side 122 along a vertical axis A that extends in parallel with the leg 10. The first coupling end 122 further has a plurality of connecting sections 130 to bridge the first support section 126 and first ridge 132, and also bridge the second support section 128 and the first ridge 132. As shown in FIG. 4, the first and second support sections 126 and 128 preferably have the first ridge 132 formed respectively on the upper side and lower side thereof so that the upper and lower surfaces of the first coupling ends 122 receive almost same forces to improve durability, also referring to FIGS. 4 and 6.

Figure 5:
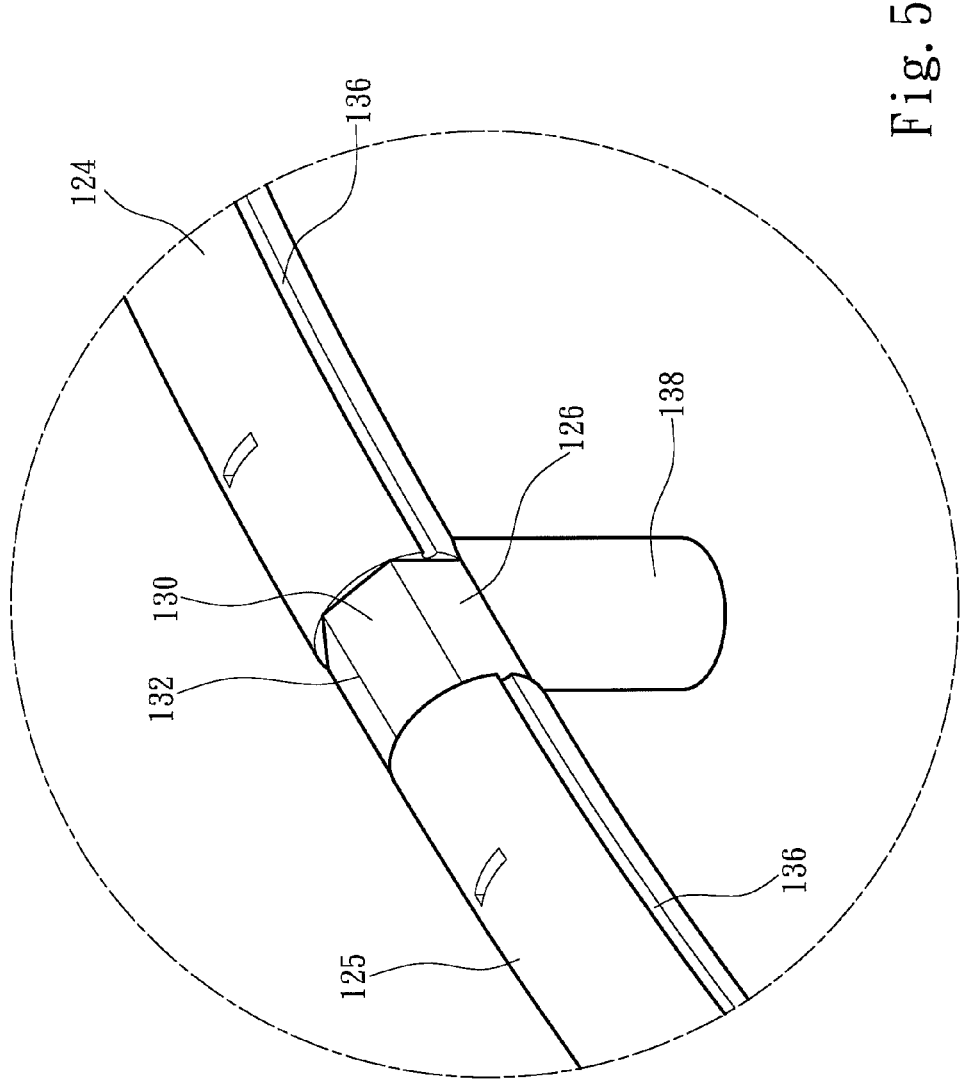
FIG. 5 is a schematic view of the first and second support tubes in a coupled condition.
Figure 6:
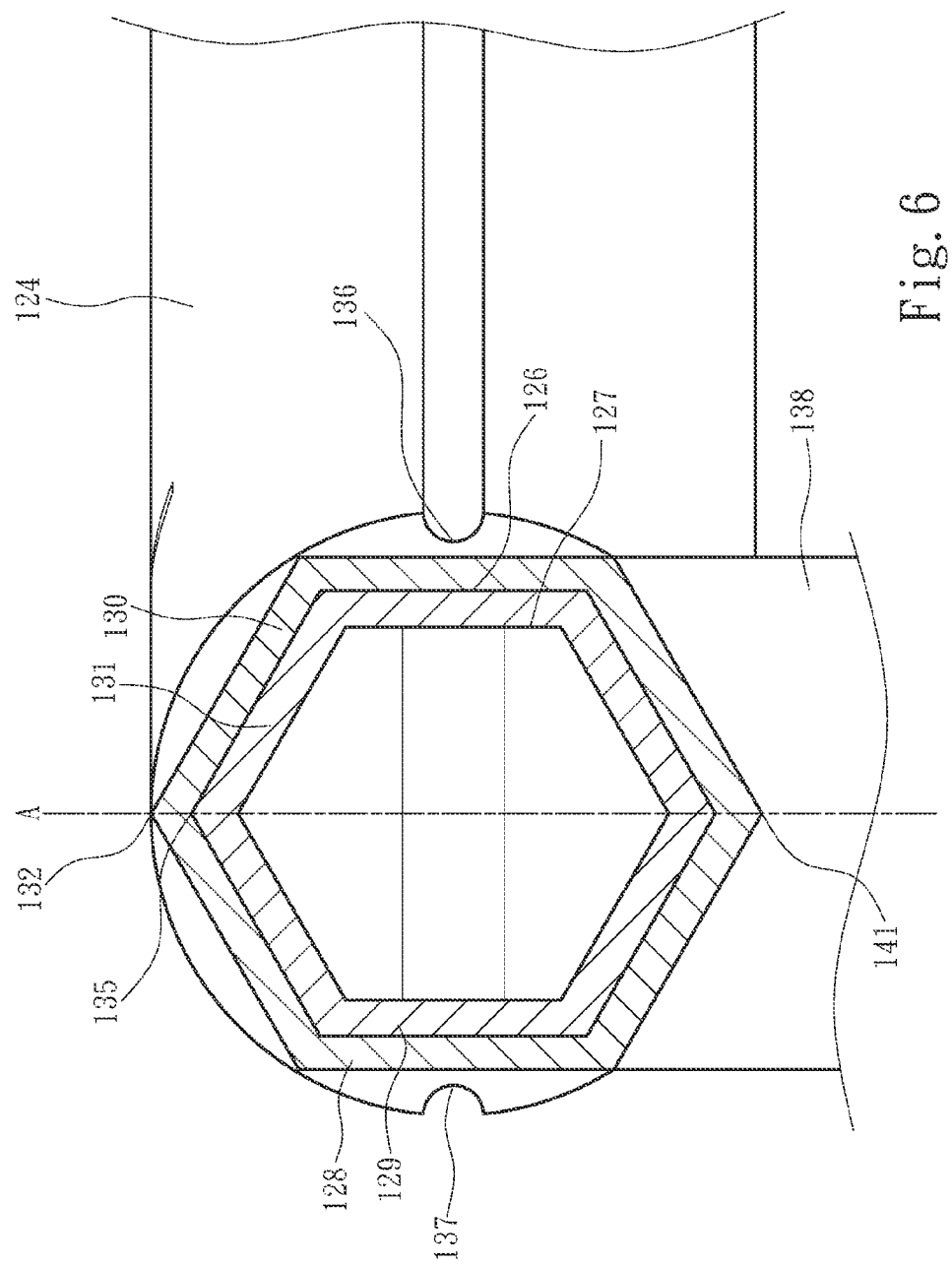
FIG. 6 is a cross section of the first and second coupling ends in a coupled condition.

To facilitate coupling with the first coupling end 122 the second coupling end 123 of the second support tube 121 has a first auxiliary support section 127 on the inner ring side 15, a second auxiliary support section 129 on the outer ring side 16, and a first auxiliary support ridge 135. Similarly, the second coupling end 123 also has a plurality of connecting sections 131 to bridge the first auxiliary support section 127 and first auxiliary ridge 135, and bridge the second auxiliary support section 129 and first auxiliary ridge 135. Referring to FIGS. 5 and 6, the first and second support sections 126 and 128 of the first coupling end 122 are flat surfaces. The cross section of the first coupling end 122 formed by surrounding of the first support section 126, second support section 128 and connecting section 130 is hexagonal. Similarly, in FIG. 3 the first coupling end 139 and second coupling end 140 at another end of the bent tubes 120 and 121 also correspond to the first coupling end 122 and second coupling end 123 that can be coupled to form the circular support rack 12. Referring to FIG. 6, the first coupling end 122 of the first support tube 120 corresponds to and can be coupled with the second coupling end 123 of the second support tube 121. The first coupling end 122 and second coupling end 123 have a preset dimensional difference. As shown in FIG. 6, the first coupling end 122 has an opening greater than the second coupling end 123 so that the inner surface of the first coupling end 122 forms a tight coupling with the outer surface of the second coupling end 123. The second coupling end 123 engages with the inner side of the first coupling end 122. Although the second coupling end 123 does not directly bear the stretching stress of the elastic member 22, the mutual engagement can transfer the forces so that the first auxiliary support section 127, second auxiliary support section 129 and first auxiliary ridge 135 can bear a portion of stress. Similarly, the first auxiliary ridge 135 can also disperse the stress and enhance physical strength to improve durability of the circular support rack 12.

Through the first ridge 132 and connecting section 130, first support section 126 and second support section 128, the first coupling end 122 gets a greater physical strength. Moreover, the connecting section 130, first support section 126 and second support section 128 disperse the stretching stress of the rebounding portion 2 in a multi-stage fashion so that damage to the first coupling end 122 caused by the stretching stress is smaller, as a result durability of the first coupling end 122 is much greater.

Figure 7:
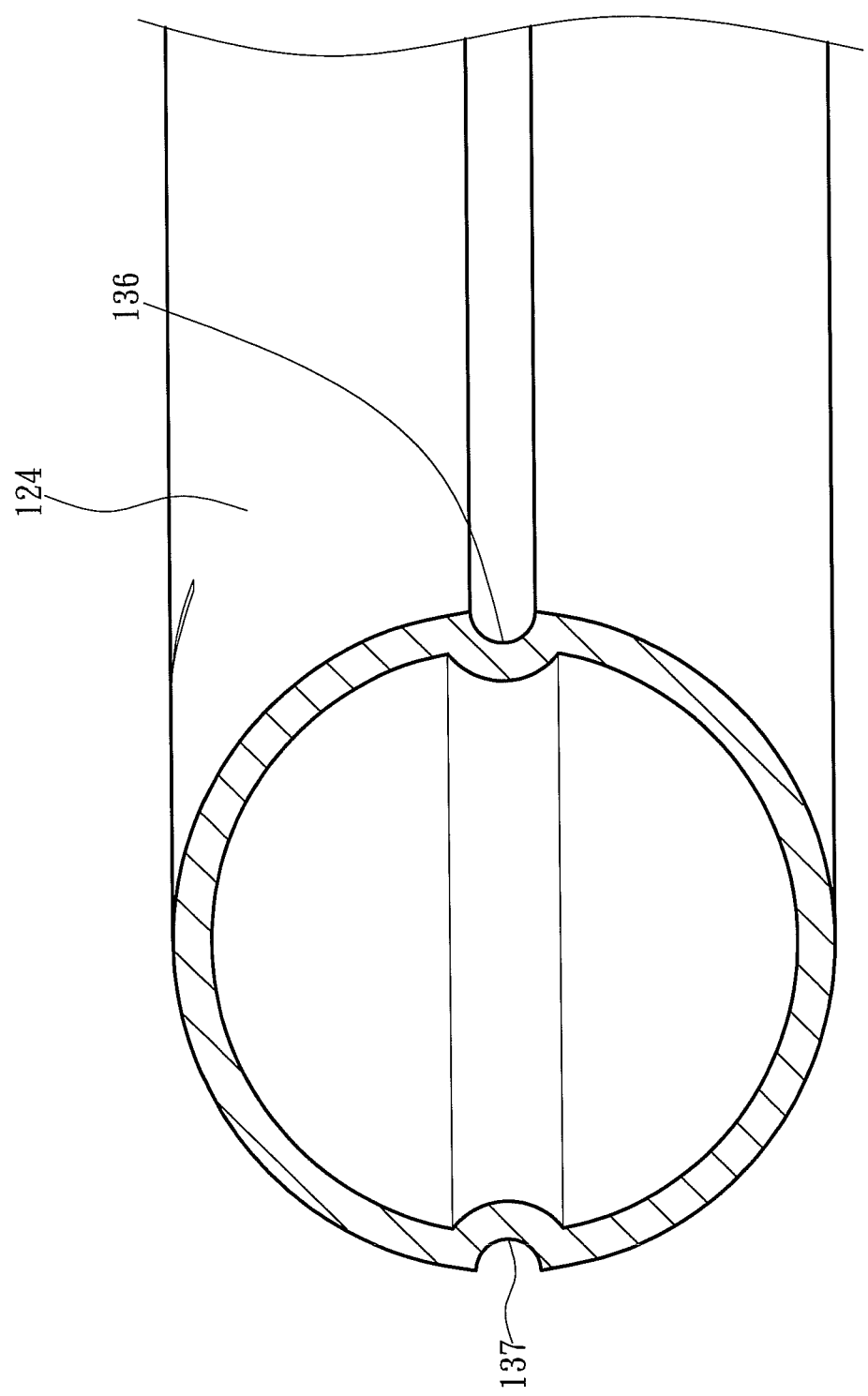
FIG. 7 is a cross section of a bent tube.

Also referring to FIGS. 3 and 6, the bent tube sections 124 and 125 of the first support tube 120 and second support tube 121 have a first groove 136 formed on the inner ring side 15, and a second groove 137 formed on the outer ring side 16. FIG. 7 shows more clearly the first groove 136 and second groove 137 on the first bent tube section 124. The first and second grooves 136 and 137 on the bent tube sections 124 and 125 aim to transfer stretching stress to the center of the bent tube sections 124 and 125 so that the upper surfaces of the bent tube sections 124 and 125 do not have to bear all the stretching forces of the elastic members 22.

By means of the features set forth above, the first ridge 132 and first auxiliary ridge 135 provide stronger physical strengths for the first and second coupling ends 122 and 123, and also disperse the stress more evenly to other portions. In addition, the first and second grooves 136 and 137 on the bent tube sections 124 and 125 provide enhanced physical strength for the circular support rack 12 to increase durability.

Figure 8:
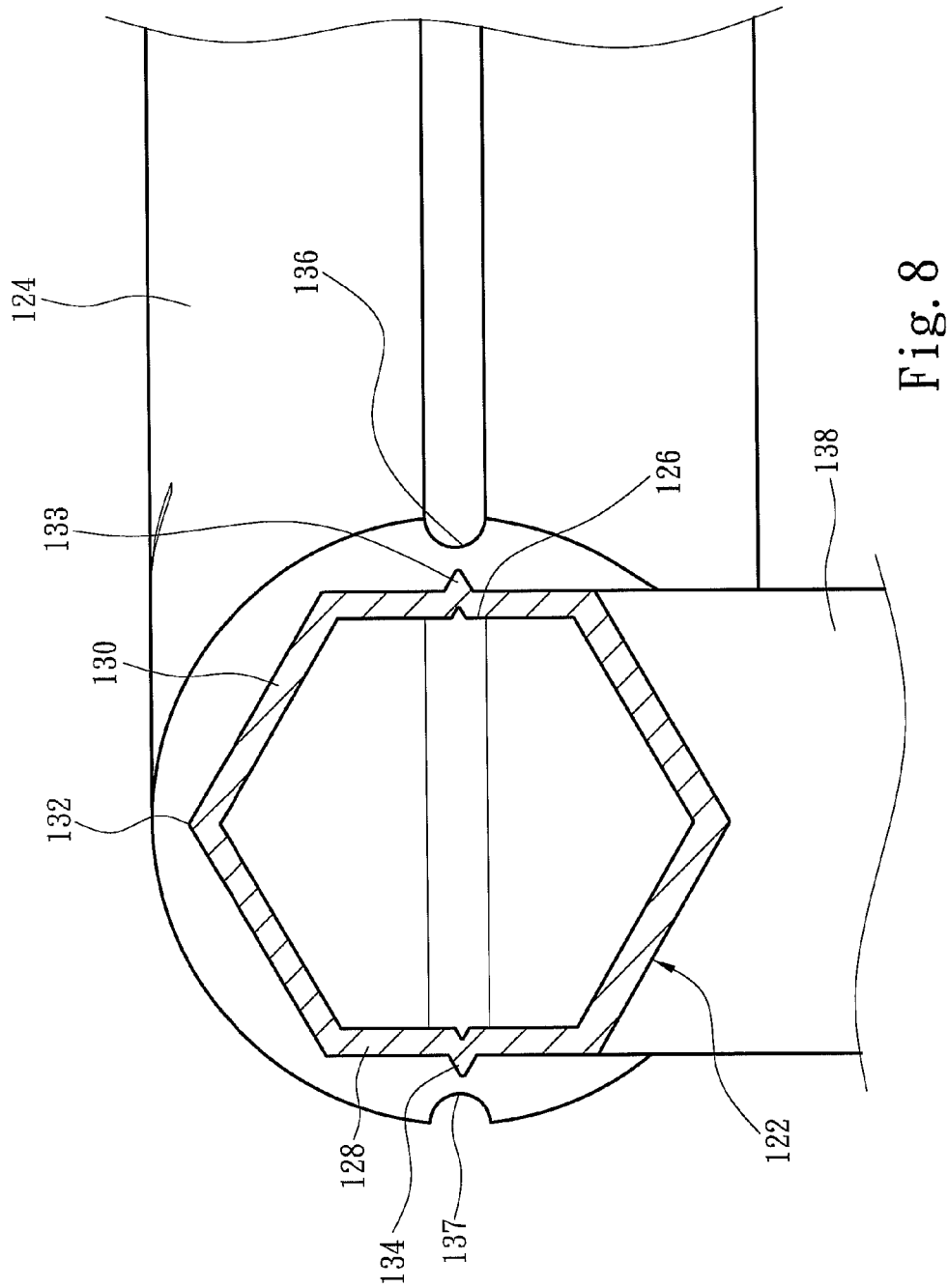
FIG. 8 is a cross section of another embodiment of a first coupling end.
Figure 9:
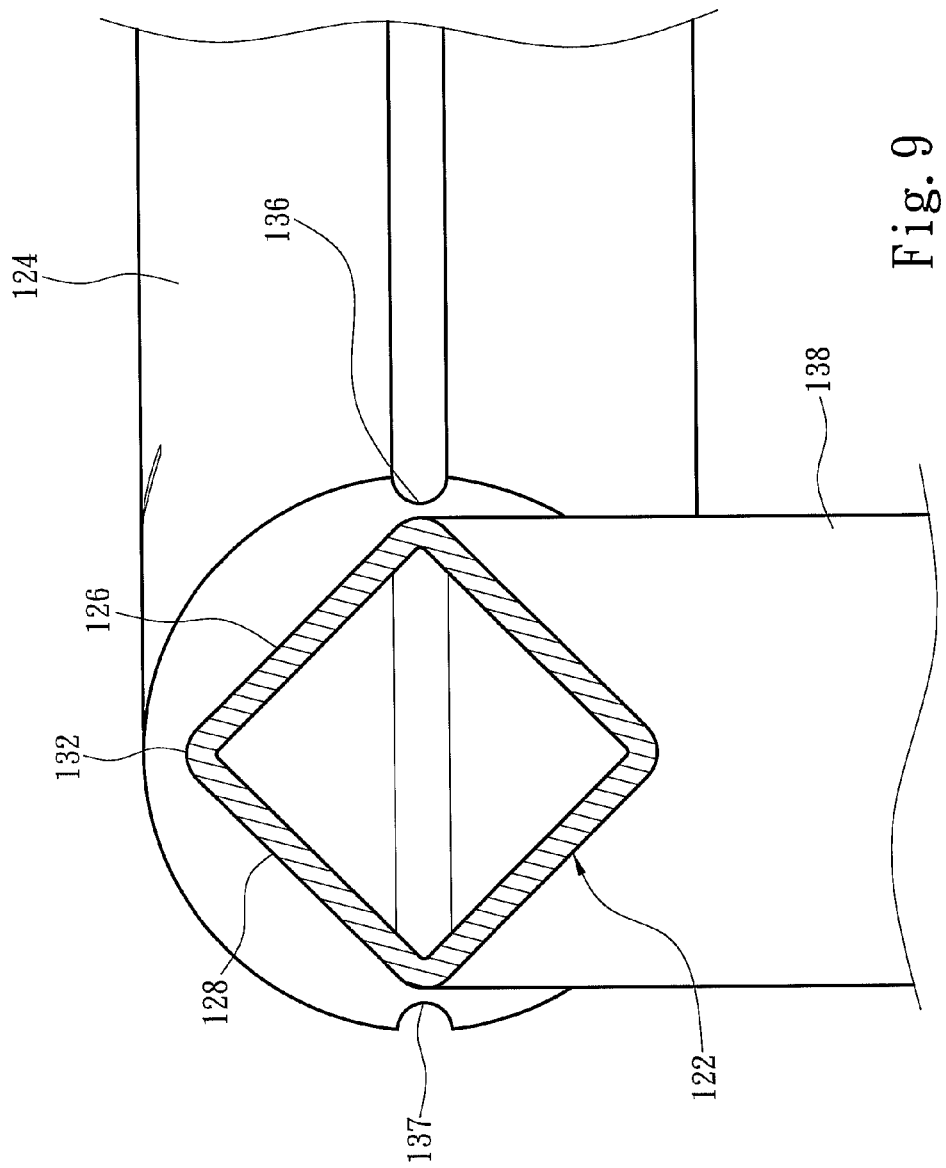
FIG. 9 is a cross section of yet another embodiment of a first coupling end.

Please refer to FIG. 8 for another embodiment of the first coupling end 122 which includes a first support section 126 on the inner ring side 15 and a second support section 128 on the outer ring side 16. The first and second support sections 126 and 128 have respectively a first ridge 132 on the upper side and lower side. To further improve the physical strength of the first coupling end 122 the first support section 126 may be selectively formed with a second ridge 133, and the second support section 128 may also be selectively formed with a third ridge 134. The first, second and third ridges 132, 133 and 134 can disperse the stretching stress on different surfaces to reduce damage of the stress on the first coupling end 122. Refer to FIG. 9 for yet another embodiment of the first coupling end in which the first coupling end 122 has the first support section 126 and second support section 128 bent at a selected angle so that the cross section of the first coupling end 122 becomes quadrilateral. The first and second support sections 126 and 128 also have respectively a first ridge 134 on the upper and lower sides to disperse the stretching stress.

While the invention has been described by means of specific embodiments, numerous modifications and variations could be made thereto by those skilled in the art without departing from the scope and spirit of the invention set forth in the claims.

What is claimed is:

1. A trampoline, comprising:
a rebounding portion including a pad and a plurality of elastic members on the circumference of the pad; and
a circular support rack which is connected to the elastic members to surround the rebounding portion and supported by a plurality of legs, and includes a vertical axis parallel to the legs and bisecting a profile of the circular support rack into an inner ring side facing the rebounding portion and an outer ring side opposite to the inner ring side, the circular support rack containing at least one first support tube and one second support tube, the first support tube including a first coupling end, a first jointing end and a first bent tube section between the first coupling end and the first jointing end, the second support tube including a second coupling end corresponding to the first jointing end, a second jointing end corresponding to the first coupling end and a second bent tube section between the second jointing end and the second coupling end, the first and second bent tube sections respectively including a first groove on the inner ring side and a second groove on the outer ring side to transfer stretching stress from the rebounding portion to the center of the first and second bent tube sections, the first coupling end and the second coupling end respectively including a first support section on the inner ring side, a second support section on the outer ring side, and at least one first ridge which is located on the vertical axis between the first support section and the second support section and formed by protruding towards a direction away from the legs to disperse stress from the plurality of elastic members to the first support section and the second support section equally.

2. The trampoline of claim 1, wherein the first support section and the second support section are connected to the first ridge through at least one connecting section.

3. The trampoline of claim 1, wherein the first jointing end and the second jointing end include a first auxiliary support section contacted with the first support section, a second auxiliary support section contacted with the second support section and a first auxiliary ridge contacted with the first ridge.

4. The trampoline of claim 1, wherein the first support section includes a second ridge.

5. The trampoline of claim 1, wherein the second support section includes a third ridge.

6. The trampoline of claim 1, wherein the first coupling end and the second coupling end include a fourth ridge which is between the first and second support sections and extends towards the legs along the vertical axis.

7. The trampoline of claim 1, wherein the pad includes a plurality of connection rings on the perimeter, each elastic member including a first end fastened to one connection ring and a second end fastened to the circular support rack.

8. The trampoline of claim 1, wherein the first support tube further includes a branch tube.

\* \* \* \* \*